United States Patent [19]

Finet

[11] 4,430,963

[45] Feb. 14, 1984

[54] SYSTEM FOR GENERATING DRY COAL WEIGHT SIGNAL FOR COAL FEEDER AND CONTROL SYSTEM BASED THEREON

[75] Inventor: Alain Finet, Newbury, Ohio

[73] Assignee: General Signal, Stamford, Conn.

[21] Appl. No.: 446,613

[22] Filed: Dec. 3, 1982

[51] Int. Cl.$^3$ .............................................. F22B 37/42
[52] U.S. Cl. ................................. 122/449; 110/101 C; 110/101 CC; 222/58; 414/147
[58] Field of Search ........ 110/101 R, 101 C, 101 CC, 110/101 CB; 414/147; 222/58; 122/449

[56] References Cited

U.S. PATENT DOCUMENTS

| | | |
|---|---|---|
| 4,071,166 | 1/1978 | Legille et al. |
| 4,313,387 | 2/1982 | Sato. |
| 4,373,451 | 2/1983 | Gardner et al. ............... 110/101 CC |

FOREIGN PATENT DOCUMENTS

465659 6/1950 Canada.
49062 4/1982 European Pat. Off. ..... 110/101 CC

Primary Examiner—Edward G. Favors
Attorney, Agent, or Firm—Leitner, Palan, Martin & Bernstein

[57] ABSTRACT

A system for generating a dry coal weight signal is provided, wherein the moisture content of a coal feed to a solid fuel burner is determined, and the dry coal weight calculated on that basis. Moisture content is determined by measuring density of the coal being fed and/or the torque required to drive a head pulley about which the belt feeding the coal is led at a constant velocity. The dry coal weight signal can be communicated to the drive means, whereby the belt speed is accelerated or decelerated to maintain a constant supply of coal, on a dry weight basis, to the boiler. Also disclosed is a control system employing the dry coal weight signal for a plurality of control functions.

20 Claims, 7 Drawing Figures

SYSTEM FOR GENERATING DRY COAL WEIGHT SIGNAL FOR COAL FEEDER AND CONTROL SYSTEM BASED THEREON

FIELD OF THE INVENTION

This invention is directed to a system for generating a dry coal weight signal for control of a coal feeder for a furnace or boiler. Specifically, this invention relates to a system for generating a signal on the basis of which the feed rate of a coal feeder may be maintained at a constant dry weight value.

BACKGROUND OF THE INVENTION

The burning of solid fuel, in particular, coal, in a boiler or furnace is one of the most wide-spread methods of generating heat and/or energy. With the increasing costs of fuel, in particular, coal, maximizing the efficiency of boiler performance has become a paramount goal.

One parameter that effects the BTU's that a boiler requires, and its performance, is the moisture content of the coal. Moisture is present in commercial feedstocks as both inherent and surface moisture. Inherent moisture generally does not vary outside a narrow range, while surface moisture may vary greatly. The presence of moisture in the coal produces two types of errors or fluctuations which decrease boiler efficiency. The first is a weighing error. Generally, coal feeders are gravimetric in nature, the amount of coal being delivered to the feeder being tied to the calculated mass of the fuel source. As the moisture content in coal increases, an increasing portion of the fuel delivered is not in fact BTU releasing fuel at all, but water. As BTU content decreases, a BTU imbalance in the boiler occurs, with changes in operating conditions.

The presence of this moisture introduces a second error and further decreases boiler efficiency. There is a substantial heat loss encountered in changing the moisture in the coal into steam (1030 BTU/lb. of $H_2O$). Accordingly, among other variables, the variation of surface moisture content of coal requires a boiler control system to correct for variations in the BTU content of the fuel, and the oxygen, in the form of air, necessary to completely combust the available coal, thereby maximizing the release of BTU's available.

As noted, in conventional systems, the amount of fuel supplied is generally determined on a mass basis, which does not allow for compensation for the moisture content of the coal.

BTU release is achieved by combustion of the combustible elements in the fuel through rapid combination with oxygen, in the form of air feed to the boiler. The air supplied, like the mass of the fuel supplied, is subject to control systems to maximize the heat released while minimizing losses. Some of the losses are the result of incomplete combustion, which forms CO rather than $CO_2$, and the losses going up the stack. The failure to convert CO into $CO_2$ results in appreciable loss in combustion efficiency, since only 28% of the available energy in the carbon is released.

Thus, one of the controlled system functions is to provide enough air to ensure complete combustion while keeping the amount of air in excess of that theoretically required for perfect combustion to a minimum. The excess air not used in the combustion of a fuel unit leaves the unit at stacked temperature. The energy required to heat this air serves no purpose and is lost, reducing boiler efficiency.

In addition, the amount of $NO_x$ (a pollutant) in the flue gas is a function of the excess air in the boiler. Theoretically, if there is no $O_2$ available to bond with nitrogen (N), there is no chance for the formation of $NO_x$. As noted above, the BTUs available, and accordingly, the overall amount of air necessary, will vary with moisture content. Accordingly, some excess air is necessary to ensure release of all the energy in the fuel, but, at the same time, excess air reduces the boiler efficiency and contributes to air pollution. An ideal combustion control system, or feeder system, should be designed to match the feed available BTUs with an appropriate amount of air, and thereby maintain the BTU level at as constant a value as possible.

Conventional prior art boiler control systems generally control boiler performance and efficiency by adjusting the air flow to the boiler according to the measured temperature or pressure of the fuel load, and/or adjusting the amount of fuel being feed to the boiler. Such systems are described in U.S. Pat. No. 4,313,387 and Canadian Pat. No. 465,659. Other systems measure the same variables, but compensate by adjusting the fuel load delivered to the boiler, as is done in U.S. Pat. No. 4,071,166. Conventionally, these control systems may be combined, so that the amount of air delivered and mass of fuel delivered to a boiler is constantly adjusted, based on measurements of the temperature of the fuel load, combustion gases and pressure.

Figure 1:
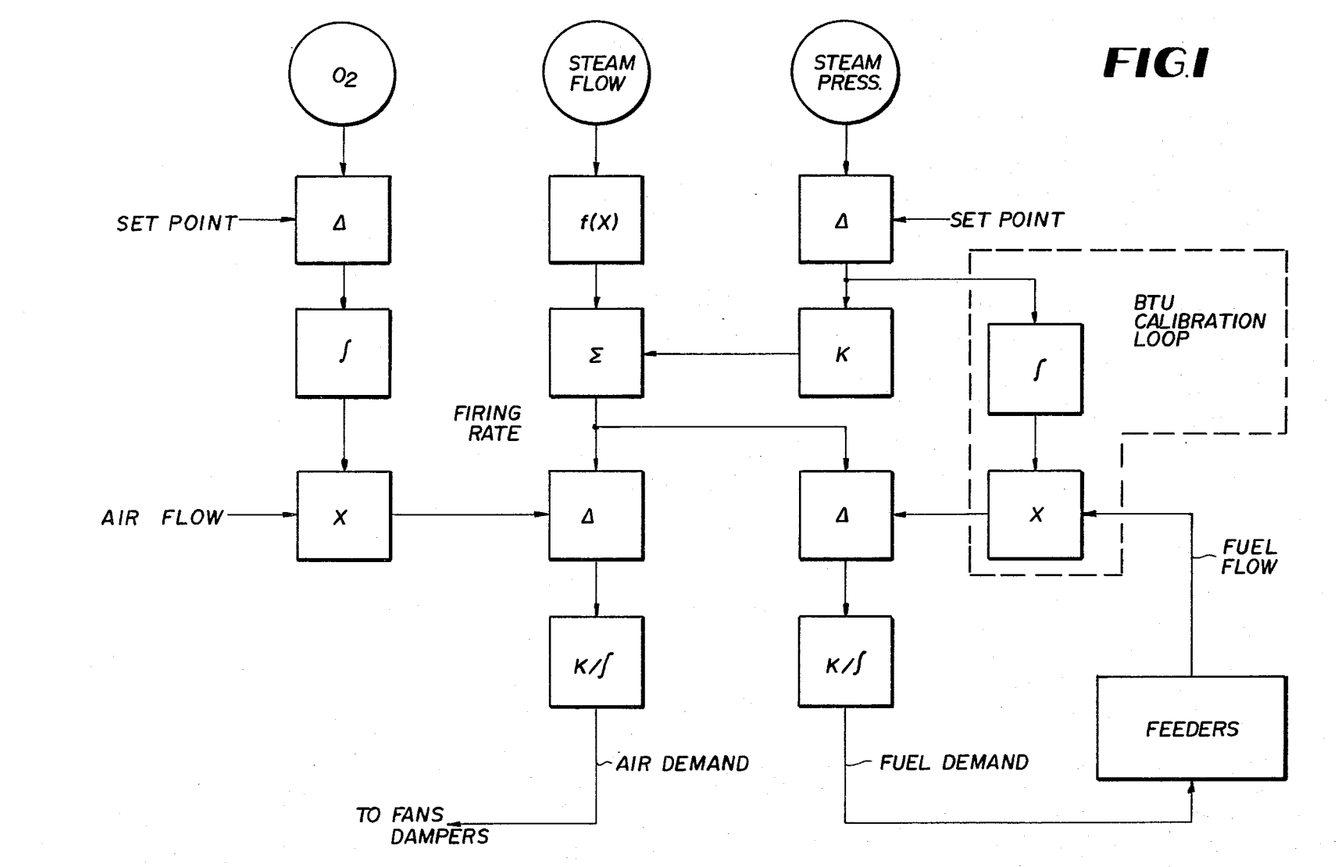
FIG. 1 is a schematic flow chart representation of a conventional boiler control system.

A conventional, simplified boiler control system is illustrated in FIG. 1. Fuel demand is calculated on the basis of measurements made of boiler performance, after burning of the fuel. This calculated fuel demand signal is communicated to the fuel feeder, thereby increasing the fuel flow and the net BTU available.

In this system, steam flow is equivalent to turbine output and steam pressure to the energy (BTU) imbalance in the system. The steam flow signal sets the fuel firing rate for the correct value at a steady state. This signal is corrected by a function generated to match the efficiency v. load characteristics of the boiler. On any load change, the steam pressure loop generates an over- or-under firing signal to the fuel control in order to move the unit as rapidly as possible to the new load level. As is apparent from FIG. 1, correction to both the fuel supply and air supply system of the boiler is dependent on measurements taken during and after burning of the fuel already supplied to the boiler, for correction for changes in the fuel load, which may be due to changes in the moisture content. Generally, these measurements are made of the fuel bed, or, more popularly, of the effluent gases of the boiler. Accordingly, as illustrated in FIG. 1, the fuel flow is not adjusted for changes in the fuel load, nor is the air stream adjusted, until after the fuel originally causing the load imbalance to occur is burnt.

A wide difference in the amount of correction required by the fuel in air controls occurs with changes in the BTU content of the fuel supplied to the boiler. The compensation in the fuel loop in the control system of FIG. 1 is carried on initially by changes in the firing rate signal until the BTU correction loop takes over. The function of the BTU correction loop is to compensate for any difference between the inferred BTU content of the fuel and its actual net value which, as noted it above, may be different due to changing moisture content. The fuel loop is, in theory, a BTU loop which satisfies the system heat input requirement; but, in reality, it is a loop that supplies pounds of fuel with an inferential heat value and to which a correction signal is applied to compensate for errors in this value. As noted, the BTU correction value is determined by measurements taken from the boiler after burning of the fuel, i.e., steam pressure. The disadvantage of this system is that the BTU correction loop has a slow response and substantial BTU imbalance in this system can develop when a change in the BTU content of the fuel occurs, for instance, upon a change in moisture content.

It is apparent that these control systems compensate for BTU variations in the fuel while or after the fuel is burnt. These systems eventually restore the BTU/air balance in the system, however, while correction is being effected, frequently a period of several minutes, a BTU/air mismatch occurs, since the air is not set at the correct value for the BTUs available. Thus, another reason for maintaining an excess air cushion in the boiler is to prevent an unsafe, fuel-rich mixture during transient conditions. If a means to determine the BTU value were immediately available for the central system of FIG. 1, a heat imbalance could be avoided when the BTU content of the fuel changes. Thus, if a means to detect and compensate for BTU variations in the fuel before it is burned could be employed, the BTU/air mismatch could be eliminated or at least substantially reduced in magnitude and duration. This would allow for operation of the controlled boiler with a reduced excess air cushion. As noted, the presence of an excess cushion reduces boiler efficiency. A reduction in the amount of this cushion necessarily improves boiler efficiency.

It is an object of this invention to generate a moisture compensated dry weight coal signal for use in a boiler control system.

It is another object of this invention to provide a dry coal weight signal generating system upon which a boiler control system which improves boiler efficiency can be based.

It is another object of this invention to provide a boiler control system which compensates for the surface moisture content of the coal being feed.

This and other objects of the invention will be apparent from the detailed description below.

SUMMARY OF THE INVENTION

The coal feed rate to a boiler is controlled by generation of a dry coal weight signal. In order to maintain a relatively constant net BTU content in the fuel stream being fed to the boiler, the surface moisture content of the feedstock is determined. The feed rate is adjusted on the basis of that moisture content, to ensure a constant BTU supply of coal to the boiler on a dry weight basis. Moisture content is determined by measurement of coal density and/or feeder head pulley torque, each value or pair of values corresponding to a particular surface moisture content for a particular feedstock. The moisture factor is then used to determine the percent of dry coal in the span. The wet coal feed rate is adjusted according to this figure, in order to maintain a constant supply of dry equivalent coal. The moisture content of the feedstock is thereby adjusted for prior to burning, maintaining a better BTU/air ratio.

DETAILED DESCRIPTION OF THE INVENTION

Figure 2:
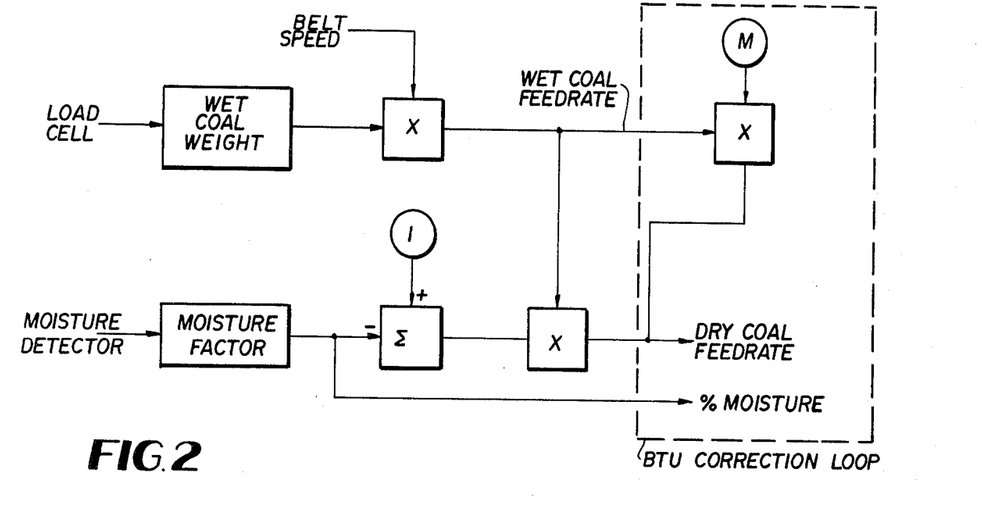
FIG. 2 is a schematic flow chart representation of the dry coal weight signal generating system of the instant invention as used for calculating fuel flow rate.

The dry weight coal signal generating system of this invention is illustrated in FIG. 2, a simplified block diagram of the feeder control system. From load cells, the wet coal weight is obtained. A moisture detector measures the percent moisture or moisture factor in the coal. This factor is then used to determine the percent of dry coal in the span or dry factor. The feed rate of the wet coal is then multiplied by the dry factor to obtain the feed rate on a dry coal basis, a signal corresponding to that value being generated. As is apparent, to correct for moisture content and maintain a constant value for the feed rate on a dry basis, any given wet feed rate should be multiplied by the reciprocal of the calculated variation in moisture content, or dry factor.

This dry coal weight signal is communicated to the belt drive system, which is adjusted so as to maintain the dry coal feed rate constant. Thus, generation of a dry coal weight signal allows the feeder to maintain a constant dry coal amount to the boiler, which, for any given fuel supply, will maintain a substantially constant BTU supply to the boiler, minimizing the need for a substantial excess air cushion. The calculated feed rate thus improves the fuel control loop of FIG. 1 between fuel demand calculation and the feeders. Instead, feed rate is adjusted between the time the moisture content of the fuel being supplied is measured and the fuel is delivered to the boiler, improving the responsiveness of the control system.

As is illustrated in FIG. 2, the BTU correction loop of the conventional control system of FIG. 1 has been improved and now provides direct outputs such as wet coal feed rate to the feeder motor. However, as is discussed below, some of the content of this system may be further used.

It will be apparent that by measuring the moisture content of the coal being fed to the boiler before it is burned, the instant dry coal weight signal generating system allows a conventional coal feeder to maintain the supply of coal to the boiler constant, on a dry coal weight basis. Accordingly, for any particular feedstock, the total available BTU content of the fuel will remain substantially constant, in turn, the air flow should similarly remain substantially constant, reducing the necessary excess air cushion for any boiler, and increasing its efficiency. The dry coal weight signal generated by the instant system can also be applied, with additional calculations, to adjust the air flow to the boiler to further enhance the response of the control system, and additionally reduce the excess air cushion. This reduces variations in steam pressure and temperatures allowing for more stable performance of the control system. This provides for easier optimization of the system.

Figure 3:
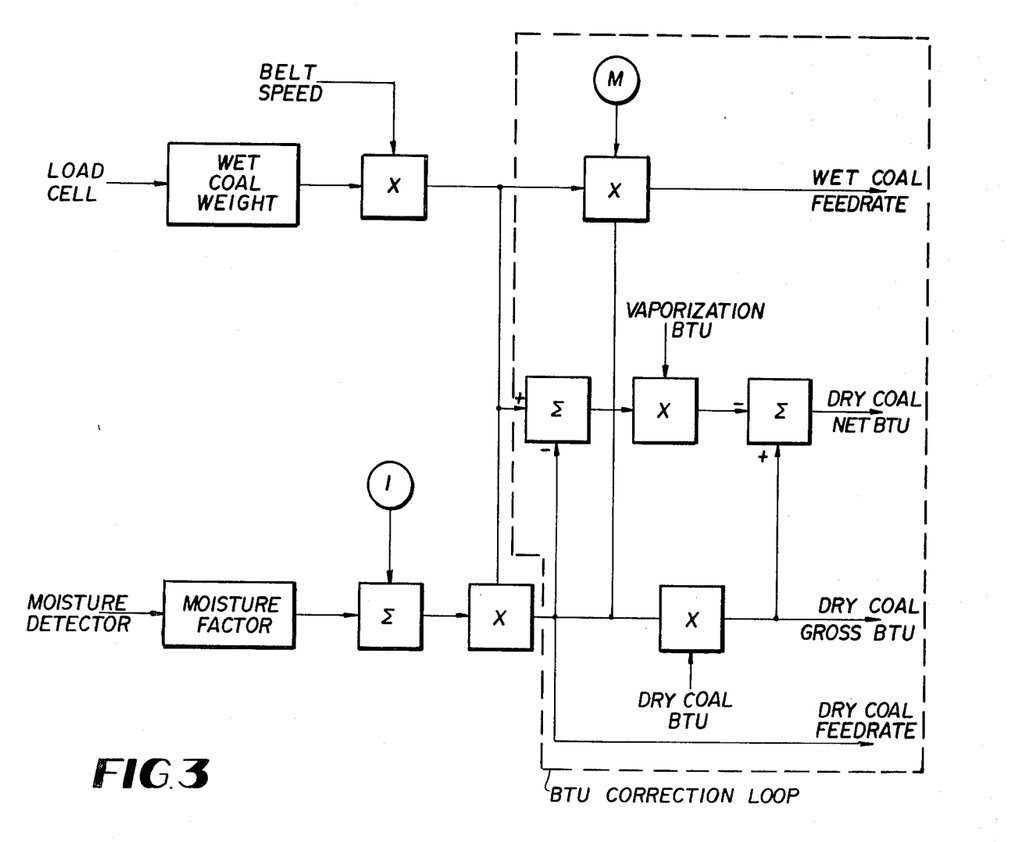
FIG. 3 is a schematic flow chart representative of the dry coal weight signal generating system of the instant invention.

Such a system is illustrated in FIG. 3, wherein the dry coal weight signal generated is employed to improve both the fuel flow, as practiced in FIG. 2, and the air and steam control loops. As illustrated, the dry coal feed rate is multiplied by the BTU content of the coal being fed, which gives the gross BTU of the coal being introduced to the boiler. This gross BTU signal is communicated to the air control loop and air supply means, whereby the necessary amount of air for any given BTU content can be calculated, prior to the burning of the fuel, thereby improving the responsiveness of the air control system.

As the actual BTU content of the coal being supplied to the boiler is calculated, the BTU content necessary to vaporize the moisture present in the coal feed can also be calculated, and this value subtracted from the gross BTU signal. The resulting net BTU signal represents the energy available from the system, and may be communicated to a steam control loop.

Figure 4:
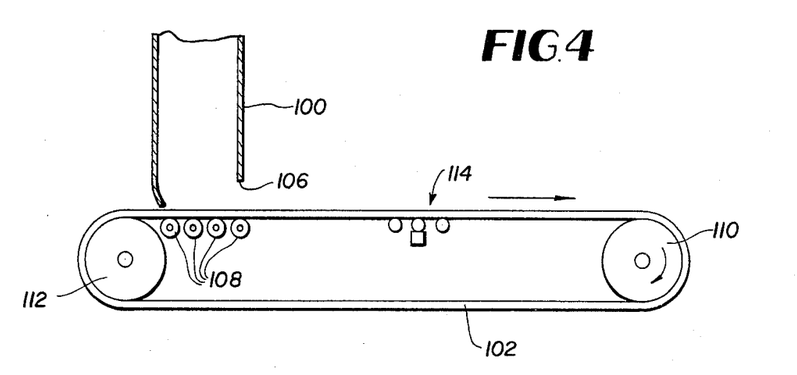
FIG. 4 is a representational elevational side view of coal feeder which may be adapted to employ the dry coal weight signal generating system of this invention.

In order to generate the dry coal weight signal of this control system, the moisture content of the coal must be calculated. A gravimetric feeder which may employ the dry coal weight signal generating system of the instant invention is illustrated in FIG. 4. The feeder broadly consists of vertical hopper 100, the bottom of which is open and rests above endless belt 102, which advances in the direction of the arrow. The downstream bottom portion of vertical hopper 100 is cut away at 106, in a shape which may be maintained by the crushed coal during its traverse on the belt 102. Preferably, this cutaway is in a trapezoidal shape. The column of crushed coal is supported on rollers 108 below the belt 102, the weight of the coal on the belt increasing the frictional engagement of the coal with the belt. This frictional engagement allows the shearing of the coal column at cutaway portion 106. Belt 102 is driven around head pulley 110, and secondary pulley 112. Head pulley 110 is driven by a variable speed motor (not shown) which maintains the speed of belt 102 at any selected velocity. The feeder also preferably includes an electronic weighing system 114 with load cell, more fully illustrated in FIG. 5.

Figure 5:
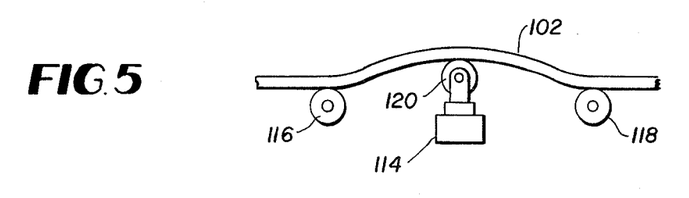
FIG. 5 is an exploded view of the mechanism employed to determine feed coal density in the coal feeder of FIG. 4.

This system is comprised of two rollers 116 and 118 which define a span of feeder belt therebetween which is always of a constant length, as the rollers are fixed in relative position. Each of rollers 116 and 118 supports one-quarter of the belt and coal load thereon, while a center roller 120, to which a load cell is attached, supports one-half the load. Load cells measure force, using strain gauges, to detect changes in either tension or compression. When an electrical excitation is supplied to a load cell, it produces an electrical output proportional to the applied force. Such load cells are conventional in the art, and many variations will be apparent to those of ordinary skill.

One convenient measurement for determining moisture content of the coal feedstock is density. Density may be easily determined through the use of the load cell of FIG. 5. As the cross-section of the coal advancing along a belt 102 is constant, due to the shape of cutout 106, the volume across the belt span defined by rollers 116 and 118 is known. The weight or mass given by load cell 120 allows for easy computation of the density of the coal being fed to the boiler.

Figure 6:
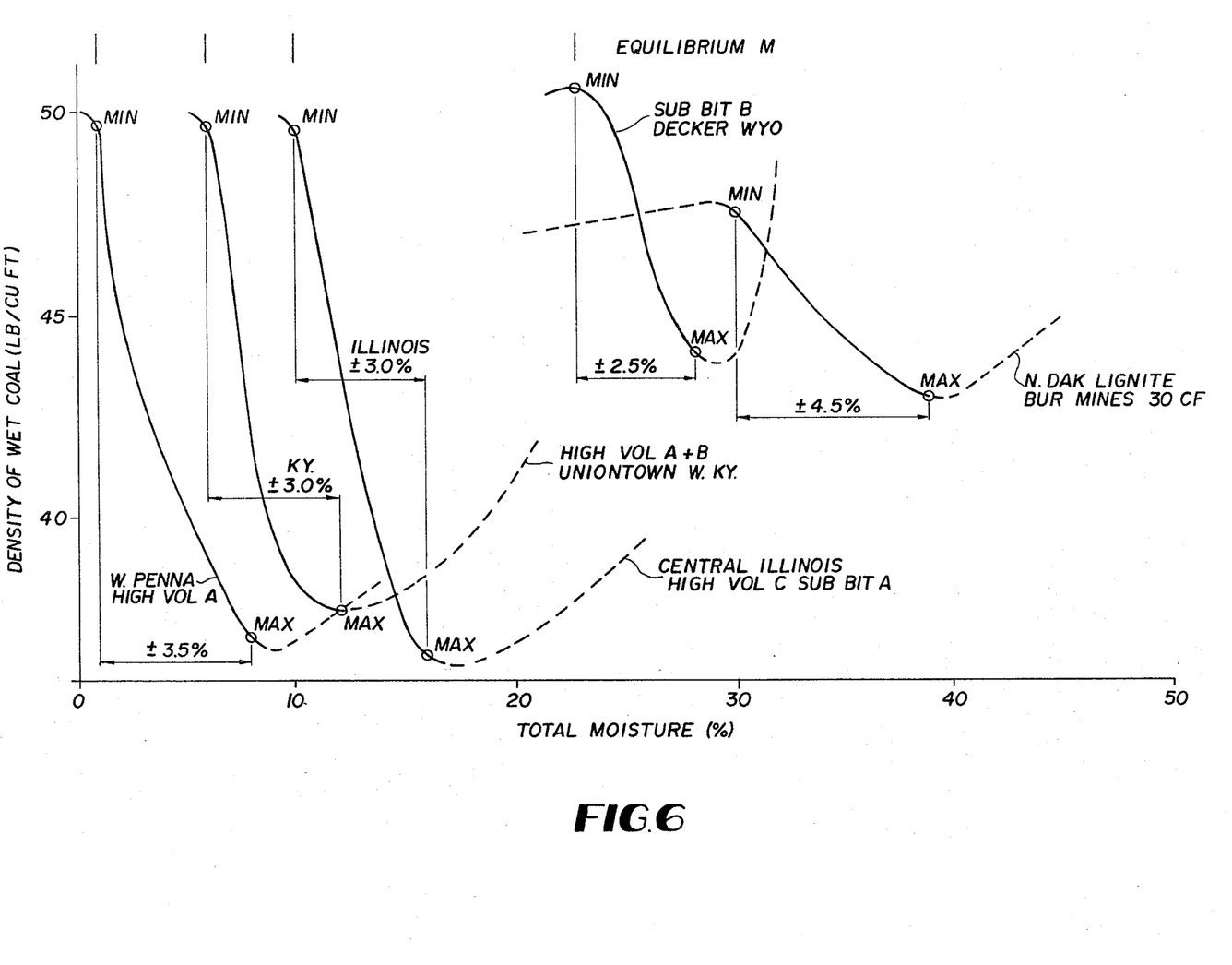
FIG. 6 is a graph plotting the density of wet coal of various representative coal feedstocks against total moisture of the feedstock.

The density of crushed coal feedstock generally decreases as surface moisture content increases. However, beyond a specific point, the density of many coal stocks increases with increasing percentage moisture. The density versus moisture content curve of a number of commercially popular coal feedstocks is provided in FIG. 6. It will be noticed that each feedstock has its own distinctive curve, although each curve exhibits the density v. moisture content behavior noted above. As is reflected in FIG. 6, it will be noted that the bend in the curve occurs in most of the conventional feedstocks at moisture contents that are characteristic of feedstocks commercially available.

Accordingly, if moisture content and adjustment of the dry feed weight is to be determined on the basis of coal density alone, the ambiguity for moisture content given by any single density measurement must be corrected, as, indeed measurements would otherwise indicate either of two moisture content levels. This ambiguity can be corrected by tracking the moisture content measurement of the feedstock from the initial introduction of that feedstock to the feeder. From a starting point, as moisture content increases or decreases, the density will either increase or decrease, respectively, depending upon what point along the graph of FIG. 6 the starting point is. Once a sufficient number of values are accummulated, it will be known on which side of the graph of FIG. 6 the feedstock actually lies, relative to the minimum density point. Therefore, to generate a moisture content signal on the basis of density alone, the graphs for the particular feedstocks to be used are stored in a computing means, such as a microprocessor. Frequent measurement of the density of the feedstock are made, and communicated to the microprocessor, along with an accurate determination of the original moisture content. After sufficient data has been accummulated, communication of the density figure to the microprocessor will allow calculation, with certainty, of the moisture content, based on the accummulated data. Thus, given sufficient information, density, alone, provides a sufficient measure of surface moisture content for generation of the dry coal weight signal of this system.

It has been discovered that, as the moisture content of the coal increases, the amount of torque required to drive head pulley 110 and therefore belt 102 at any selected speed increases. This is believed due to the increased tendency of the coal being fed to stick together and to the chute at cutaway 106 as moisture content increases. Head pulley torque can be conveniently determined by simple monitoring of the driving motor. Accordingly, complex and/or sensitive monitors or sensors are not required to accurately determine total surface moisture content, as any particular feedstock will have a single specific moisture content percentage for any particular torque. Accordingly, in order to generate a dry coal weight signal, the graphs of torque v. moisture content are stored in a computer means, as is done with density, as described above. The head pulley torque is communicated to the computing means, allowing determination of the moisture content, and generation of the moisture content signal.

Unfortunately, head pulley torque measurements have proven, experimentally, to be difficult to reproduce with great accuracy, accordingly, precise curves, together with a large amount of data, is necessary to operate the system of this invention when relying on head pulley torque alone.

Figure 7:
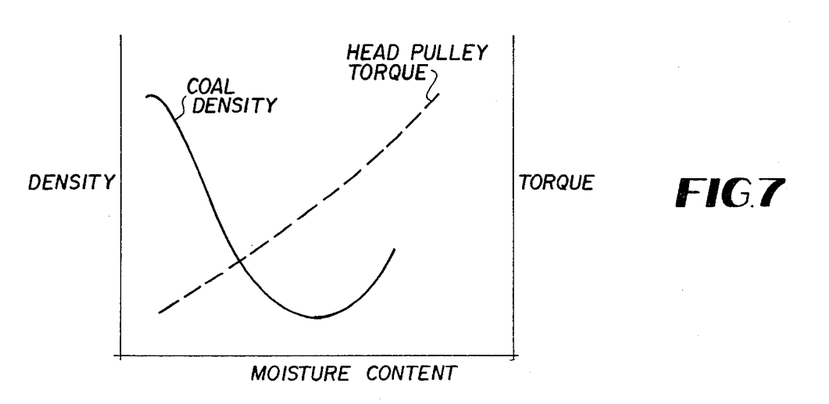
FIG. 7 is a graph plotting both density and head pulley torque against total moisture of a generalized feedstock.

To overcome the above-described disadvantages of using either density or torque along, in a preferred embodiment, in order to allow for automatic and constant generation of a dry coal weight signal, the density of the feed coal, and the head pulley torque, are measured on a continual basis and fed to a computing means, such as a microprocessor. In this microprocessor are stored data, illustrated in FIG. 7, of the density v. total moisture content for the particular type of coal being feed, as well as the torque v. moisture content curve for that same feedstock. Thus, the total surface moisture content of the coal being fed to the boiler is constantly computed, allowing for instant calculation of the dry weight content of the coal feed, and generation of the dry weight signal which is communicated to the driving motor via a control system, which is adjusted to maintain a constant dry weight coal feed.

As noted, experiments have established that, particularly with certain feedstocks, the density and torque v. moisture content values are not readily reproducible. Accordingly, a statistical analysis of the information being fed to the computing means may be performed, in order to eliminate false readings. Ideally, statistical analysis may be kept to a minimum, to simplify calculations and speed correction of the feed belt. Accordingly, the expected range of values for any particular feedstock may be stored in the computing means. So long as the received data falls within this range, no statistical analysis is necessary, and the generated dry weight signal may be immediately acted upon. However, for low probability values falling outside of this range, a plurality of readings is taken to verify the measurement before the generated signal is used.

The dry coal weight signal generating system of this invention has been described above with respect to particular embodiments. However, it will be apparent to those of ordinary skill in the art that numerous variations within the scope of this invention, particularly with respect to the exact nature of the coal feeding apparatus employed, could be arrived at without the exercise of inventive faculty. The invention is not intended to be limited to the stated embodiments, nor the theories advanced to explain the observed phenomenon.

What is claimed is:

1. A system for generating a dry coal weight signal for a coal feeder comprised of a conveying means and a drive means for driving said conveying means at a selected speed, said system comprising:
   means for measuring the density of coal being fed by said feeder;
   means for measuring the torque applied to said drive means;
   computing means receiving input from said measuring means for computing the dry weight of said coal; and
   means for communicating said calculated dry weight in the form of a signal to said drive means.

2. The system of claim 1, wherein said means for measuring density is comprised of a load cell measuring the weight of coal on a given span of belt.

3. The system of claim 1, wherein said computing means comprises a means for storing and addressing a plurality of moisture content values as a function of density and drive means torque for the particular coal being fed.

4. The system of claim 1, wherein said means for measuring torque is comprised of a monitor on said drive means.

5. A system for generating a dry coal weight signal for a coal feeder comprised of endless belt driven at a selected speed by drive means, said system comprising:
   means for measuring the density of coal being fed by said feeder;
   computing means receiving input from said measuring means for computing the dry weight of said coal; and
   means for communicating said calculated dry weight in the form of a signal to said drive means.

6. The system of claim 5, wherein said means for measuring density is comprised of a load cell measuring the weight of coal on a given span of said belt.

7. The system of claim 5, wherein said computing means comprises a means for storing and addressing a plurality of moisture content values as a function of density for the particular coal being fed.

8. A system for generating a dry coal weight signal for a coal feeder comprised of a belt and a head pulley on which said belt is driven at a constant speed by rotation of the head pulley by drive means, said system comprising:
   means for measuring the torque applied to said head pulley;
   computing means receiving input from said measuring means for computing the dry weight of said coal; and
   means for communicating said calculated dry weight in the form of a signal to said drive means.

9. The system of claim 8, wherein said means for measuring head pulley torque is comprised of a monitor on said drive means.

10. The system of claim 8, wherein said computing means comprises a means for storing and addressing a plurality of moisture content values as a function of head pulley torque for the particular coal being fed.

11. In a boiler with a feeder driven by rotation of a head pulley, air flow and a control system having a BTU correction loop to correct for fuel/air imbalances in the boiler, improvement being a dry coal weight signal generating system, said signal generating system comprising:
   means for determining the moisture content of coal being fed to said boiler;
   computing means receiving input from said determining means for computing the dry weight of said coal; and
   means for communicating said computed dry coal weight in the form of a signal to said BTU correction loop.

12. The boiler control system of claim 11, wherein said dry coal weight signal communicated to said BTU correction loop is employed by said correction loop to control and adjust the fuel feed rate of said feeder.

13. The boiler control system of claim 11, wherein said dry coal weight signal communicated to said BTU correction loop is employed by said correction loop to control and adjust the air flow to said boiler.

14. The boiler control system of claim 11, wherein said dry coal weight signal communicated to said BTU correction loop is employed by said loop to control and adjust the coal feed rate of said feeder and the air flow to said boiler.

15. The boiler control system of claim 14, wherein said dry coal weight signal communicated to said BTU correction loop is further employed by said BTU correction loop to calculate the anticipated energy release of said boiler.

16. The boiler control system of claim 11, wherein said means for determining the moisture content is comprised of a means for measuring the density of coal being fed by said feeder.

17. The boiler control system of claim 11, wherein said means for determining the moisture content is comprised of means for measuring the torque applied to said head pulley.

18. The boiler control system of claim 11, wherein said means for determining moisture content is comprised of means for measuring the density of coal being fed by said feeder and a means for measuring the torque applied to said pulley.

19. The boiler control system of claim 16, wherein said means for measuring coal density is comprised of a load cell measuring the weight of coal on a given span of said feeder.

20. The boiler control system of claim 17, wherein said means for measuring the torque applied to said head pulley is comprised of a monitor on a drive means connected to said head pulley.

* * * * *

UNITED STATES PATENT AND TRADEMARK OFFICE
CERTIFICATE OF CORRECTION

PATENT NO. : 4,430,963
DATED : February 14, 1984
INVENTOR(S) : Alain Finet

It is certified that error appears in the above—identified patent and that said Letters Patent is hereby corrected as shown below:

Column 2, line 21, change "feed" to --fed--.

Column 3, line 43, change "feed" to --fed--.

Column 7, line 11, change "feed" to --fed--.

Signed and Sealed this

Thirty-first Day of July 1984

[SEAL]

Attest:

GERALD J. MOSSINGHOFF

Attesting Officer

Commissioner of Patents and Trademarks